United States Patent [19]
Kochi et al.

[11] Patent Number: 4,833,562
[45] Date of Patent: May 23, 1989

[54] ROTARY MAGNETIC HEAD CYLINDER DEVICE FOR SUPPRESSING VIBRATIONS OF A MAGNETIC TAPE

[75] Inventors: Masanori Kochi; Juichi Morikawa; Makoto Ibe; Toshio Osada; Hitoshi Takizawa; Hideyuki Kawase; Ikuo Nishida, all of Katsuta; Eiichi Hanawa, Mito; Hitoshi Okabe, Hitachi; Tosio Uno, Mito, all of Japan

[73] Assignees: Hitachi Ltd.; Hitachi Video Engineering, Incorp., both of Tokyo, Japan

[21] Appl. No.: 56,954

[22] Filed: Jun. 3, 1987

[51] Int. Cl.$^4$ ............................................. G11B 15/60
[52] U.S. Cl. ................................................. 360/130.24
[58] Field of Search ................................. 360/103–105, 360/107, 130.23, 130.24, 130.22, 130.2, 130.21

[56] References Cited

U.S. PATENT DOCUMENTS

T941022  12/1975  Freeman et al. ............... 360/130.24
4,524,402  6/1985  Ueda et al. ..................... 360/130.24

FOREIGN PATENT DOCUMENTS 3545062  7/1986  Fed. Rep. of Germany ....................... 360/130.24
958622  5/1964  United Kingdom ................ 360/107

OTHER PUBLICATIONS

IBM/TDB, vol. 17, No. 5, Oct. 1974, p. 1486, "Controlling Tape/Head Clearance * * * ", by Jones et al.

Primary Examiner—John H. Wolff
Attorney, Agent, or Firm—Antonelli, Terry & Wands

[57] ABSTRACT

A rotary magnetic head cylinder device for use in a helical-scanning system video tape recorder has a projection provided on a tape running race of a stationary lower cylinder near a location at which a magnetic tape leaves from the lower cylinder. The projection is preferably integral with the tape running race and has a small area which is defined by a shoulder circumferentially extending identically with a tape guide shoulder contouring the lower edge of the tape running race and which spreads perpendicularly to the tape running race, and an upper surface coplanar with the top face of the lower cylinder, and a height defined by a protruded length radially outwardly toward the outer circumferential surface of the lower cylinder. The projection serves to reduce vibrations of the magnetic tape generated when the video head carried by the rotary upper cylinder leaves from the magnetic tape.

6 Claims, 9 Drawing Sheets

ROTARY MAGNETIC HEAD CYLINDER DEVICE FOR SUPPRESSING VIBRATIONS OF A MAGNETIC TAPE

BACKGROUND OF THE INVENTION

This invention relates to a rotary magnetic head cylinder device, for use in a helical scanning system video tape recorder, in which vibrations of a magnetic tape generated at times when a video head on a rotary cylinder leaves from the magnetic tape can be reduced.

In the helical scanning system video tape recorder, the magnetic tape is wound around the circumference of the rotary cylinder over approximately 180 degrees so that video signals can be recorded on or reproduced from the magnetic tape by means of the rotating magnetic heads along a direction oblique to the longitudinal direction of the magnetic tape. In this case, the front end of the magnetic head protrudes radially outwardly from the outer circumferential surface of the rotary cylinder. Accordingly, when the magnetic head is in contact with a magnetic face of the mangetic tape, a portion of the magnetic tape around the contact portion with the magnetic head is forced to be separated from the outer circumferential surface of the rotary cylinder by the magnetic head, causing a significant pressure or force to be exerted by the magnetic head on the magnetic tape. Upon leaving or disengagement of the magnetic head from the magnetic tape, the pressure or force collapses abruptly and an impact generated at that time causes the magnetic tape to vibrate. Disadvantageously, vibrations thus generated lead to a jitter which occurs during reproduction.

The occurence of jitter will now be explained by referring to the drawings. FIG. 6 illustrates, in perspective view form, a rotary magnetic head cylinder device of a conventional magnetic recording and reproducing apparatus. Referring to FIG. 6, a rotary cylinder 3 is divided into an upper cylinder 20 and a lower cylinder 21, with magnetic heads 6 interposed between the upper and lower cylinders 20 and 21. A magnetic tape 11 is helically wound around the outer circumference of the cylinder 3 over about 180 degrees by means of two guide pins 12 and 13 and is advanced in the direction B along a tape guide 22 formed at the outer circumference of the lower cylinder 21. The magnetic head(s) 6 can be rotated by itself or along with the upper cylinder 2 in a direction A to contact with the tape 11 and leaves in such a manner that a magnetic head 6 starts to coe into contact with a lower edge of the magnetic tape 11. As best seeen in FIG. 9 depicting parts of the upper and lower cylinders in a sectional view, the magnetic head 6 is mounted to the upper cylinder 20 through a head plate 23 and rotates together with the upper cylinder 20. The front end of the magnetic head 6 protrudes radially outwardly beyond the outer circumferential surfaces of the upper and lower cylinders 20 and 21 and consequently the magnetic tape 11 is forced to be spaced from the outer circumferential surfaces of the cylinders 20 and 21 at and near the contact portion with the magnetic head.

In the conventional device thus constructed, when recording or reproducing video signals on or from the magnetic tape by advancing the magnetic tape in the direction B and rotating the magnetic head in the direction A, the magnetic head 6 starts contacting with the lower edge of the magnetic tape 11 and then leaves from the upper edge of the magnetic tape 11, as shown in FIG. 6. As long as the magnetic head 6 is kept in contact with the magnetic tape 11, the magnetic head exerts a pressure or force on the magnetic tape at the contact portion thereof but when the magnetic head 6 leaves or escapes from the upper edge of the magnetic tape 11, the pressure or force collapses abruptly to give an impact on the magnetic tape 11 which causes the magnetic tape 11 to vibrate at its upper edge C (FIG. 6). Vibrations thus occurring in the tape 11 lead to an undesirable reproduction picture on a screen of a television or video monitor 14 wherein, for example, a line E which should normally be a single straight line is undulated at a region D, as shown in FIG. 7. The undulation on the picture is generally called a jitter. The result of spectral analysis of the jitter is shown by a graph in FIG. 8.

SUMMARY OF THE INVENTION

An object of the present invention is to provide a rotary magnetic head cylinder device capable of reducing the above-mentioned drawbacks.

According to the invention, with a view of reducing vibrations of the magnetic tape generated when the video head leaves from the magnetic tape at a tape outlet, that is, when the video head is released from the contact with the magnetic tape at a side of the tape from which the head leaves from the tape, a small projection is formed at a portion of the lower cylinder near the location at which the tape leaves from the lower cylinder in the recording or the normal reproducing (playback) mode of operation. The projection serves to reduce a pressure or force exerted by the video head on the tape to reduce an impact force exerted on the tape upon departure of the head, thereby suppressing or minimizing vibrations of the tape around the outlet, i.e. at a side where the tape leaves from the cylinder and where the head leaves from the tape in the recording or the normal reproducing mode of operation.

BRIEF DESCRIPTION OF THE DRAWINGS

These and other objects as well as the features of the present invention will be made clearer by the explanation referring to the drawings in which.

DESCRIPTION OF THE PREFERRED EMBODIMENTS

Figure 1:
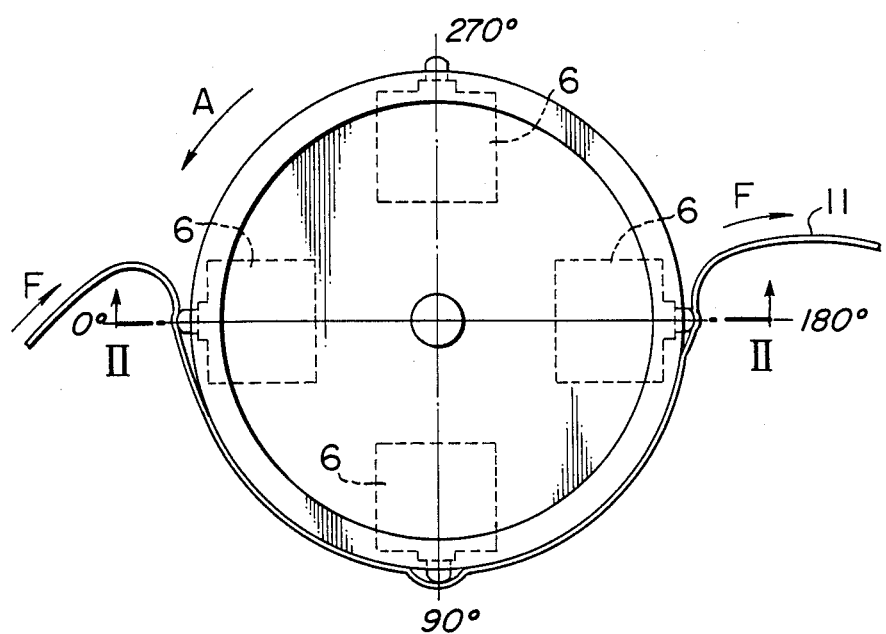
FIG. 1 is a plan view showing a rotary magnetic head cylinder device according to an embodiment of the present invention.
Figure 2:
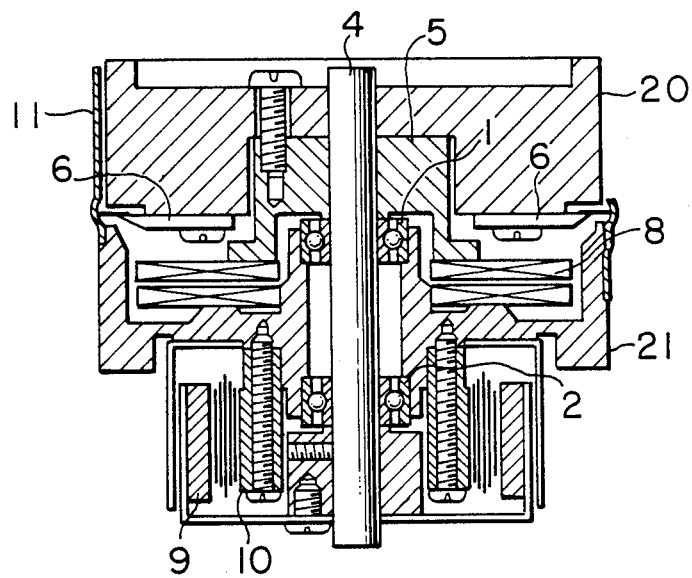
FIG. 2 is a longitudinal sectional view taken along the line II—II of FIG. 1.

A rotary magnetic head cylinder device according to an embodiment of the invention will now be described with reference to FIG. 1 illustrating a plan view of the device and FIG. 2 illustrating a longitudinal sectional view taken along the line II—II of FIG. 1. In these Figures, a shaft 4 is rotatably supported by a lower cylinder 21 through ball bearings 1 and 2 and a disc 5 is fitted around an upper end portion of the shaft cylinder 20 securely carrying video heads 6 is fixed and a lower end face to which a part of a rotary transformer 8 is securely bonded. Fixedly mounted to a lower end portion of the shaft 4 is a drive rotor magnet 9 which forms an electric motor co-operatively with a wound coil stator 10 to exert a drive force (torque) on the shaft 4. For recording and reproducing, each of the video heads 6 protrudes slightly radially outwardly beyond a tape sliding surface or an outer circumference of the upper cylinder 20 to be contacted with a magnetic tape 11. It is assumed in the following description that the rotary cylinder is rotated in a direction of arrow A, and that the magnetic tape starts to be wound about the rotary cylinder at an angular position representative of 0 degree and is advanced in the direction F through the 90 degree angular position to leave from the cylinder at the 180 degree angular position, which is followed by the 270 degree angular position. These angular positions are herein referred to tape wind angular position.

Figure 3:
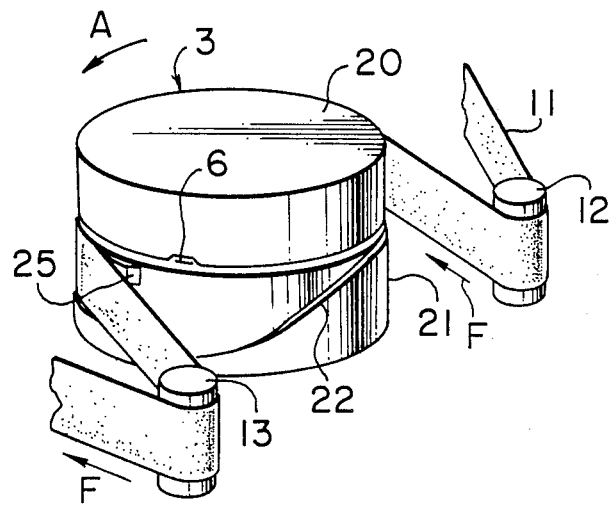
FIG. 3 is a perspective view showing a rotary magnetic head cylinder device of a magnetic recording and reproducing apparatus according to an embodiment of the present invention.
Figure 4:
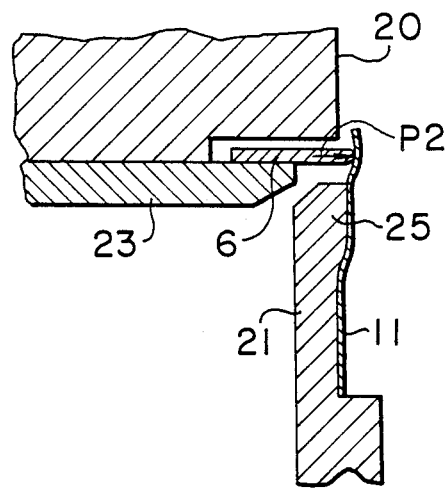
FIG. 4 is a fragmentary sectional view of the rotary magnetic head cylinder device shown in FIG. 3.

FIG. 3 illustrates, in perspective view form, the rotary cylinder device of a magnetic recording and reproducing apparatus according to an embodiment of the present invention such as the embodiment shown in FIGS. 1 and 2. FIG. 4 illustrates, in fragmentary sectional view, the rotary cylinder device of FIG. 3. As best seen in these Figures, the magnetic tape 11 is wound around the outer circumferential surface of the rotary cylinder 3 over about 180 degrees by means of guide pins 12 and 13. A projection 25 is provided at a position of an upper edge of the outer circumference of the lower cylinder 21 where the magnetic tape 11 leaves from the cylinder 3, so that the magnetic tape 11 may be wound over the projection 25 and leave from the rotary cylinder 3 by way of the projection 25.

In the device thus constructed, the magnetic tape 11 wound about the outer circumferential surface of the rotary cylinder 3 can be set to pass through its passage situated more remote from the central axis of the rotary cylinder 3 around the projection 25 and hence contact pressure exerted by the magnetic head 6 on the magnetic tape 11 can be reduced when the head 6 passes by the projection 25. As the magnetic head 6 proceeds to leave from the magnetic tape 11 under the reduced pressure condition, impact exerted on the magnetic tape 11 at a time when the magnetic head 6 leaves from the magnetic tape 11 can be reduced, thereby avoiding the occurrence of substantial vibrations of the magnetic tape 11.

Figure 5:
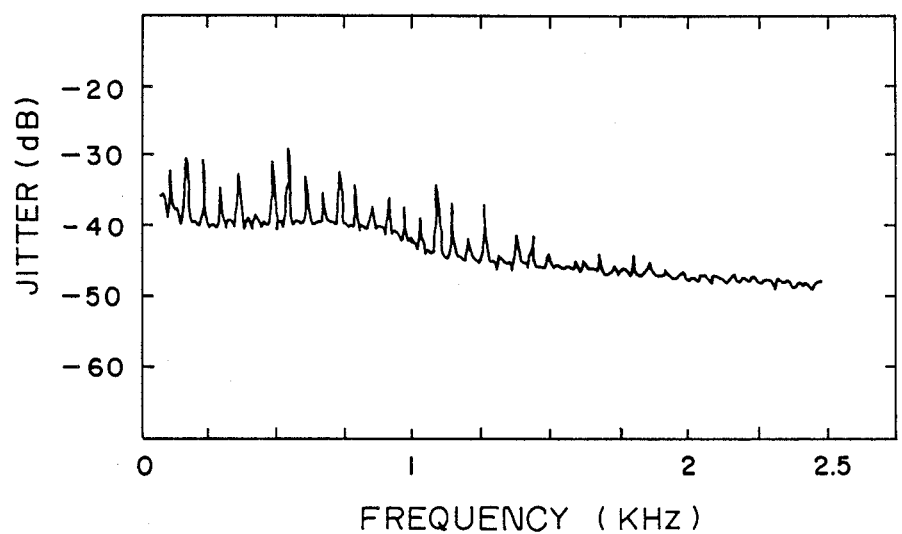
FIG. 5 is a graph showing a spectrum of a jitter generated in the device according to the embodiment of the invention.
Figure 6:
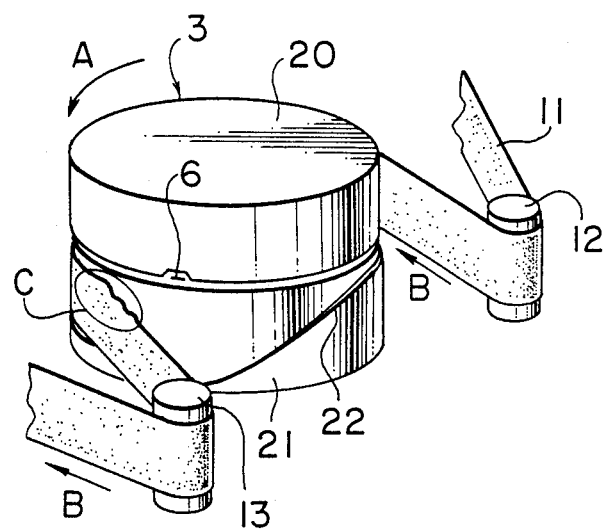
FIG. 6 is a perspective view of a conventional magnetic head cylinder device.
Figure 7:
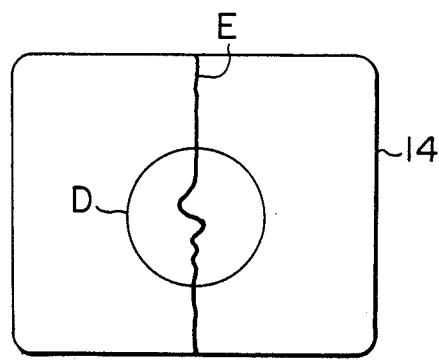
FIG. 7 is a diagrammatic view showing a picture displayed on a screen of a monitor in case of the conventional magnetic head cylinder device.
Figure 8:
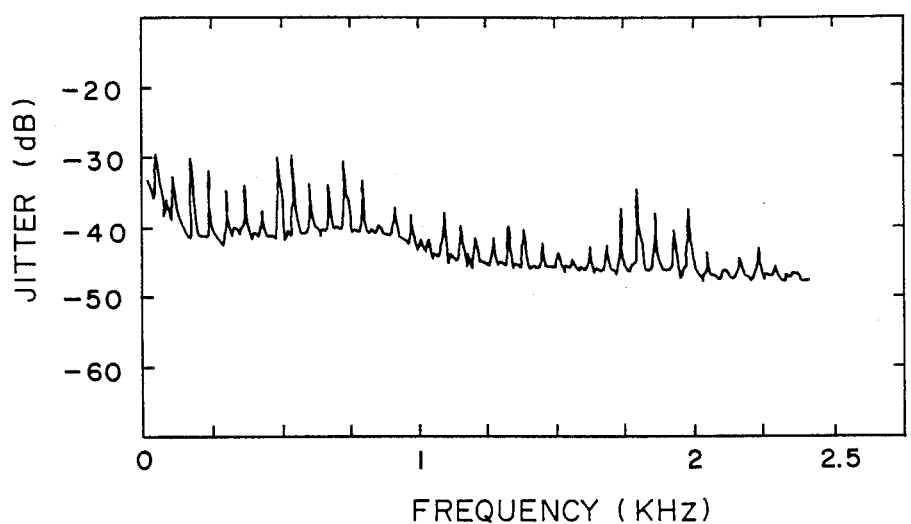
FIG. 8 is a graph showing a spectrum of jitters generated in the conventional device.
Figure 9:
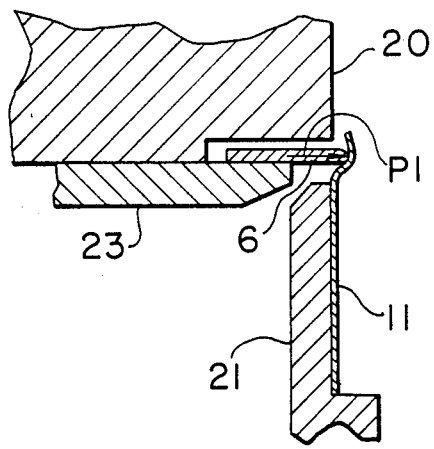
FIG. 9 is a fragmentary sectional view of the conventional rotary magnetic head cylinder device shown in FIG. 6.
Figure 10:
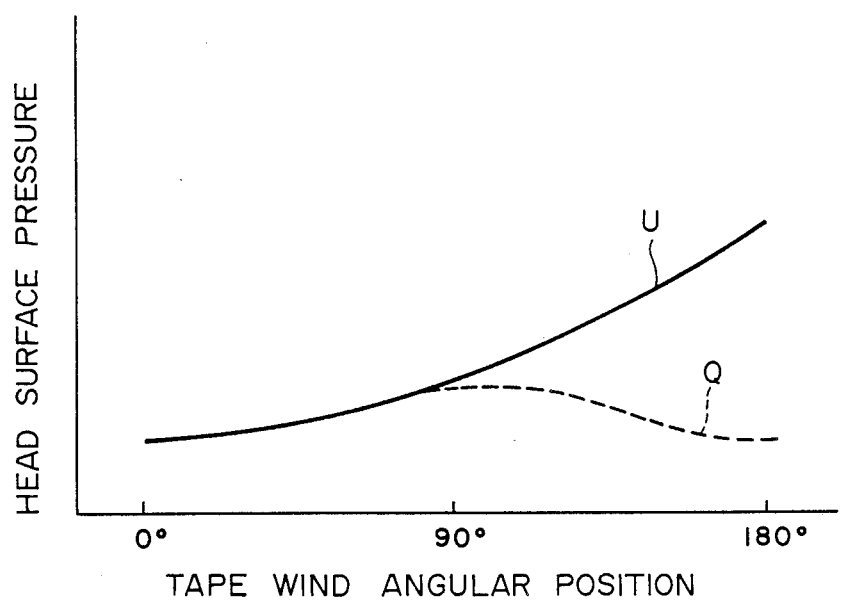
FIG. 10 is a graph showing the relationship of head surface pressure with respect to tape wind angular position.
Figure 11:
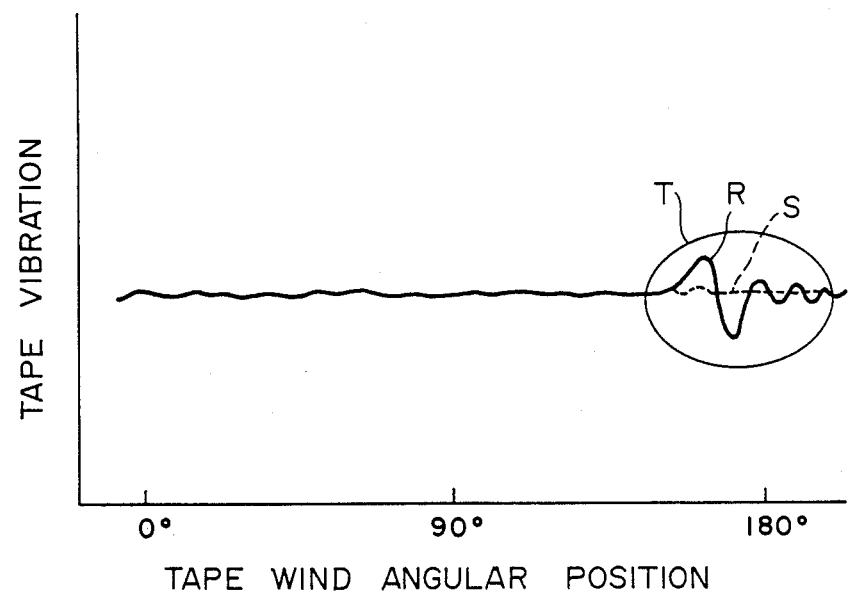
FIG. 11 is a graph showing vibrations of tapes at a point of time in relation to tape wind angular positions.

There are shown in FIG. 5 results of spectral analysis of the jitter generated in the magnetic recording and reproducing apparatus incorporating the cylinder device thus constructed according to the embodiment of the invention. In FIG. 5, the ordinate represents the jitter [dB] and abscissa represents frequencies [kHz]. When compared with the jitter as shown in FIG. 8 generated in the conventional apparatus, it will be appreciated that the level of the jitter is lowered at a frequency range around 2 kHz in FIG. 5. FIG. 11 graphically shows the relation between the tape wind angular position and the tape vibration. The tape vibration means an amplitude of vibration of the tape 11 averaged over a period of time that between points of time two adjacent heads 6 leave from the tape 11. In case of the conventional apparatus, a substantial vibration as shown by curve R is generated at a portion T (near tape wind end), resulting in the undulation on the reproduced picture as described before. On the other hand, according to the embodiment of the present invention, because of the small projection 25 provided near the tape wind end portion (tape wind angular position of 180 degrees) of a tape advancing passage formed around the lower cylinder 21, pressure exerted by the surface of head 6 on the tape 11 can be reduced around the 180 degree angular position as shown by a curve Q in FIG. 10 in contrast to a curve U in the conventional device. Consequently, impact caused upon departure of the head 6 from the tape 11 can be reduced in the embodiment of the present invention to avoid the generation of substantial vibration as shown by a curve S in FIG. 11 and consequently occurrence of substantial undulation in the reproduced picture can be avoided. For comparison of pressure exerted by the surface of head 6 on the tape 11, reference should be made to FIGS. 4 and 9, for example. Assuming that pressure or force P1 is exerted by the front end face of the video head 6 in the conventional apparatus shown in FIG. 9 and that exerting pressure or force is P2 in the embodiment of the present invention shown in FIG. 4, the relation $$P2 < P1$$

is always valid because the projection 25 is provided in the device of FIG. 4.

The projection 25 to be provided on the lower cylinder 21 of the rotary magnetic head cylinder device according to the invention can be formed readily upon cut-matching of the lower cylinder 21, by avoiding to cut a small region corresponding to the projection 25.

Figure 13A:
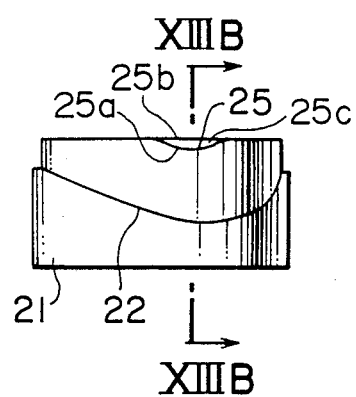
FIG. 13A is an enlarged front view showing the essential part of a lower cylinder provided with a projection.
Figure 13B:
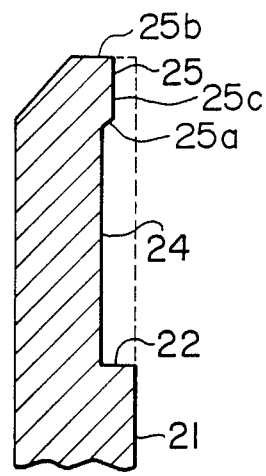
FIG. 13B is a fragmentary enlarged sectional view taken along the line of FIG. 13A.
Figure 12:
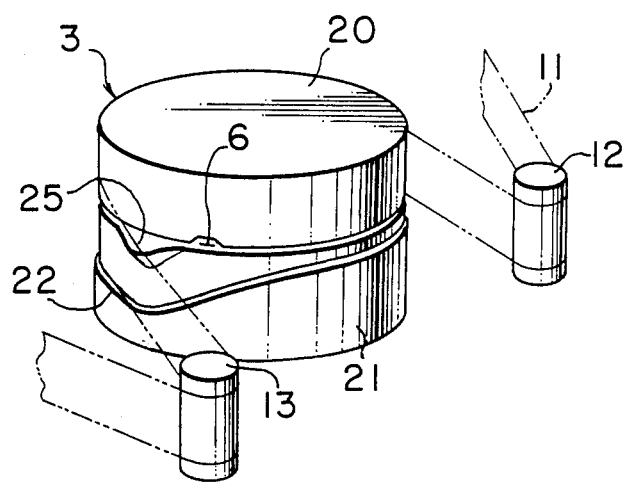
FIG. 12 is a perspective view showing a specified example of the magnetic head cylinder device according to an embodiment of the invention.

FIG. 12 illustrates, in perspective view form, an example of the rotary magnetic head cylinder device of the invention including a lower cylinder formed by the machining mentioned above. In FIG. 12, members or elements like those of FIG. 3 are designated by like reference numerals. In the illustration of FIG. 12, a projection 25 is shown exaggeratedly for enabling viewing of its shape easily. FIG. 13A is a front view of the lower cylinder 21 in which the essential part thereof including the projection 25 is enlarged and FIG. 13B is an enlarged sectional view taken along the line XIIIB—XIIIB of FIG. 13A. As in the conventional cylinder, the lower cylinder 21 has a tape running race 24 along which the tape 11 is advanced and which is situated radially inwardly relative to the outer circumferential face of the lower cylinder 21 and is concentric therewith, and a tape guide shoulder 22 contouring the lower edge of the tape running race 24 and which extends in perpendicular to the tape running race 24 and radially outwardly therefrom the outer circumferential face of the lower cylinder 21. In the formation of the lower cylinder 21 by cut-machining, a cutting tool is controlled to start cutting from the upper edge of the outer circumferential surface of a cylinderical article and to be moved downwards to form the tape running race 24 and thereafter another cutting tool is utilized to cut the lower edge of the tape running race 24, perpendicularly to the race 24, to form the tape guide shoulder 22. The projection 25 featuring the present invention is formed by excluding or avoiding to cut or machine a small portion of the outer circumferential surface of the cylindrical article at an initial phase of the machining. The projection 25 is defined by a side face comprising an arcuate shoulder 25a which extends similarly to the tape guide shoulder 22 and an upper surface 25b which is coplanar with the top face of the cylindrical article, as well as by a bulge surface 25C which is located radially outside of the tape running race 24 by 50 microns concentrical therewith.

Figure 14:
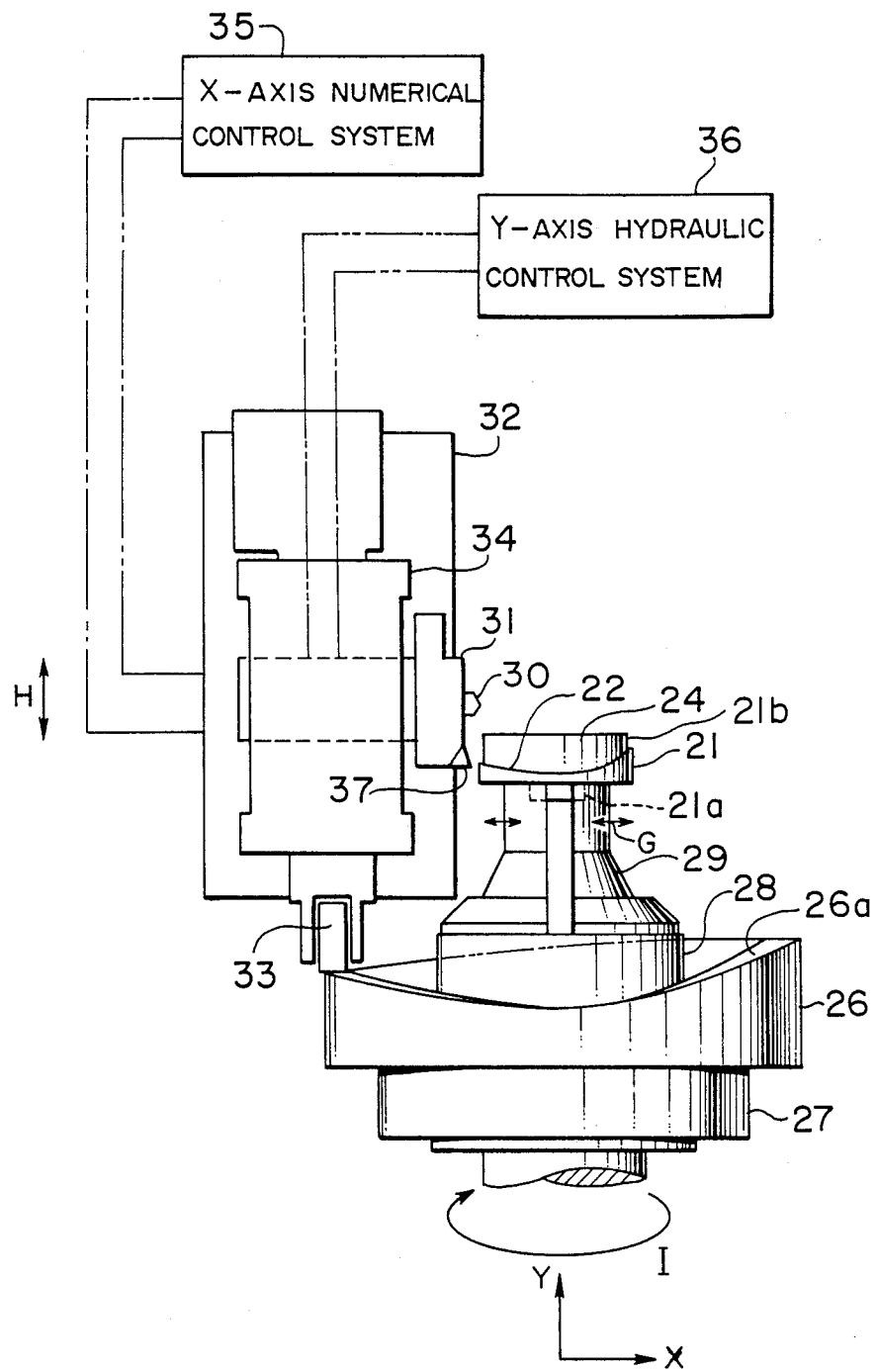
FIG. 14 is a schematic diagram illustrating a working stage of a hydraulically controlled profiling cam and lead working type numerically controlled lathe used for machining the lower cylinder.

The lower cylinder according to the embodiment of the present invention can be formed through a machining process as exemplified below in detail. The cylindrical article or material is typically machined into the lower cylinder 21 by using a hydraulically controlled profiling cam and lead working type numerically controlled lathe, working stage of which is schematically illustrated in FIG. 14. For example, Model DPL-S manufactured by Hitachi Seiko Kabushiki-kaisha is known as this type of lathe. The cylindrical material 21b for the lower cylinder 21 has a circular boss 21a clamped and held with high accuracy by fingers 29 which are slidable in the direction G with respect to a chuck 28 fixed to a cam 26 securely carried on a main spindle 27 and it can be rotated in the same direction I as the spindle 27.

On the other hand, a cam follower 33 is rotatably mounted to a lead turner 34. As the spindle 27 is rotated, the cam follower 33 reciprocates in directions of arrow H by tracking or following a cam surface 26a of the cam 26. A cutting tool holder 31 is movably mounted to the lead turner 34 so that the position of the cutting tool holder 31 can be controlled in the Y-axis direction, and a cutting tool 30 mounted to an end of the cutting tool holder 31 can also be moved following the topography or configuration of the cam surface 26a of cam 26. The cam surface 26a is selected to take a topography which is identical to a desired topography of the tape guide shoulder 22 of the lower cylinder 21.

Figure 17:
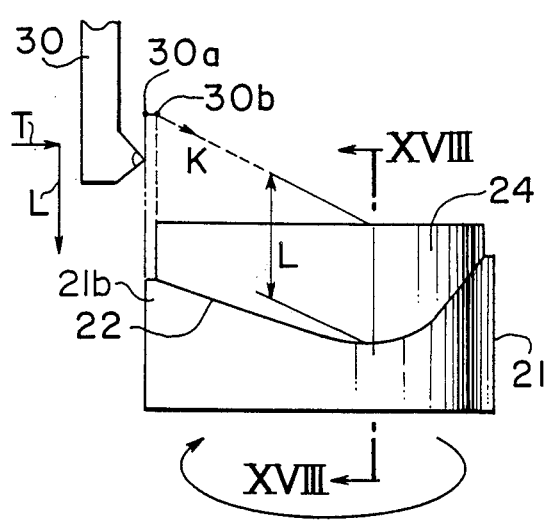
FIG. 17 is an explanatory view showing the positional relation between the lower cylinder of the conventional device and a cutting tool.
Figure 18:
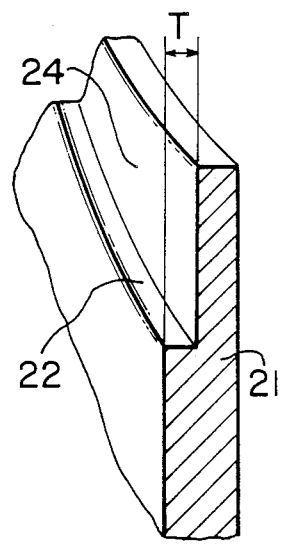
FIG. 18 is an enlarged fragmentary sectional views taken along the line XVIII—XVIII of FIG. 17.

By using this lathe, the projection 25 can be formed through a machining process as will be explained below in comparison with the conventional machining process. In the formation of the conventional lower cylinder, the cutting tool 30 is controlled for machining as shown in FIG. 17. FIG. 18 illustrates an enlarged sectional view taken along the line XVIII—XVIII of FIG. 17. An amount of cut depth T by the cutting tool 30 is set in an X-axis numerical control system 35 shown in FIG. 14 and a feed length L of the cutting tool 30 is set in a Y-axis hydraulic control system 36. Thus, the cutting tool 30 shown in FIG. 17 is moved, starting from an initial position 30a, to a position 30b which is radially inside of a cylinder material 21b by the cut depth T under the control of X axis control system 35 through a member 32 and is then moved in a direction of arrow K in FIG. 17 to profile or follow the topography of the cam surface 26a of cam 26 shown in FIG. 14 while being displaced in the Y-axis direction under the control of Y axis control system 36 at a pitch of 500 microns per one revolution of the cylinder 21b until the total feed length reaches the present length L, and another cutting tool 37 shown in FIG. 14 subsequently cuts the profiling cut edge to provide the perpendicular shoulder 22, thus eventually completes the formation of the tape running race 24 and the tape guide shoulder 22.

Figure 15:
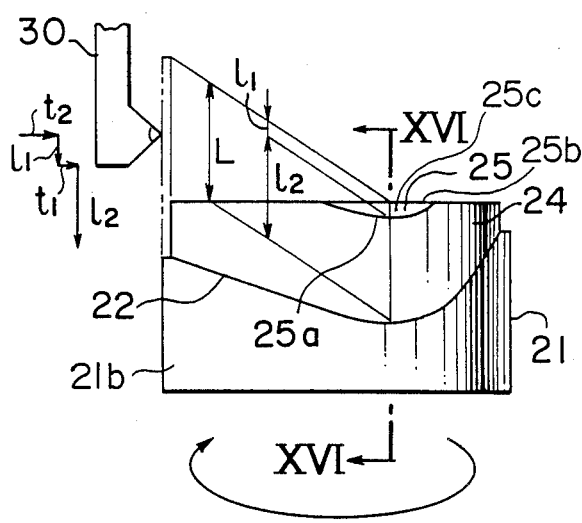
FIG. 15 is an explanatory view showing the positional relation between the lower cylinder of the device according to an embodiment of the invention and a cutting tool.
Figure 16:
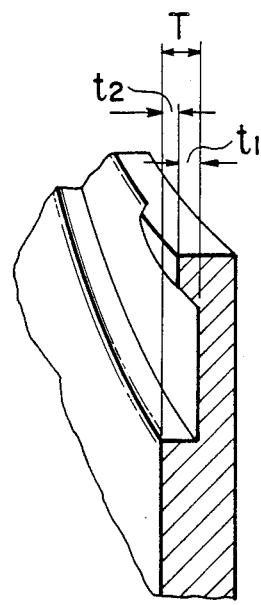
FIG. 16 is an enlarged fragmentary sectional view taken along the line XVI—XVI of FIG. 15.

In the formation of the lower cylinder 21 according to an embodiment of the present invention, the cutting tool 30 is controlled for machining as shown in FIG. 15. FIG. 16 illustrates an enlarged sectional view taken along the line XVI—XVI of FIG. 15. In order to obtain a predetermined height of the projection 25, an amount of cut depth $t_2$ from the outer circumferential surface of a cylinder material 21b is set in the X-axis numerical control system 35 shown in FIG. 14, and a predetermined length $l_1$ of the projection 25 is set in the Y-axis hydraulic control system 36 shown in FIG. 14.

After having formed a curved face 25c with the predetermined length $l_1$, the cylinder 21b is cut-machined with the predetermined cut depth $t_1$ and length $l_2$ to form the tape running race 24, thus completing the projection 25 as shown in FIGS. 15 and 16. Through the above-mentioned machining method, the projection 25 can be formed highly accurately with less irregularity and distribution of shapes among lower cylinder product 21 and the projection 25 thus formed has typically an arcuate shoulder 25a identical in the shape of the curved face with that of the tape guide shoulder 22.

In this manner, the projection featuring the present invention can be formed readily with high accuracy by adding only a cutting step of bulge face 25c at a predetermined timing in the course of cut-machining of the tape running race 24 and tape guide shoulder 22.

We claim:

1. A rotary magnetic head cylinder device for suppressing vibrations of a magnetic tape wound thereon, comprising:
    a rotary cylinder provided with at least one video head for contacting the magnetic tape;
    a stationary cylinder having a tape running race along which the magnetic tape is advanced from an entrance position to an exit position, the tape running race being located radially inside of an outer circumferential surface of the stationary cylinder and concentric therewith and having a tape guide shoulder contouring a lower edge of the tape running race, the tape guide shoulder extending perpendicularly to the tape running race from the tape running race to the outer circumferential surface of the stationary cylinder; and means for suppressing vibrations of the magnetic tape including a small projection protruding from the tape running race of the stationary cylinder and extending in the circumferential direction of the stationary cylinder only in the region of the tape exit position, the tape exit position being at an upper end of the stationary cylinder opposite to the tape guide shoulder, the projection having an arcuate surface integral with the tape running race and the tape guide shoulder and having a configuration corresponding to the tape guide shoulder so that the magnetic tape contacts the projection when the tape exits from the tape running race so as to suppress vibrations of the magnetic tape generated when the video head disengages from contact with the magnetic tape which is advanced along the tape running race.

2. A rotary magnetic head cylinder device according to claim 1, wherein the projection extends in the circumferential direction on opposite sides of the tape exit position and protrudes from the tape running race to an extent less than the outer circumferential surface of the stationary cylinder.

3. A rotary magnetic head cylinder device for suppressing vibrations of a magnetic tape wound thereon, comprising:

a rotary cylinder provided with at least one video head for contacting the magnetic tape;

a stationary cylinder having a tape running race along which the magnetic tape is advanced from an entrance position to an exit position, the tape running race being located radially inside of an outer circumferential surface of the stationary cylinder and concentric therewith and having a tape guide shoulder contouring a lower edge of the tape running race, the tape guide shoulder extending perpendicularly to the tape running race from the tape running race to the outer circumferential surface of the stationary cylinder; and means for suppressing vibrations of the magnetic tape including a small projection having first and second surfaces, the first surface being provided on the tape running race of the stationary cylinder and extending in the circumferential direction of the stationary cylinder only in thre region of the tape exit position, the tape exit position being at an upper end of the stationary cylinder opposite to the tape guide shoulder, the first surface being an arcuate surface integral with the tape running race and the tape guide shoulder and being extended in a configuration corresponding to the tape guide shoulder, the second surface being formed at an upper edge of the stationary cylinder opposite to the tape guide shoulder integrally with the tape running race and the tape guide shoulder and protruding outwardly from the tape running race toward the outer circumferential surface of the stationary cylinder and being coaxial with the tape running race, the first and second surfaces cooperatively suppressing the vibrations of the magnetic tape generated when the video head disengages from contact with the magnetic tape which is advanced along the tape running race.

4. A rotary head cylinder device according to claim 3, wherein the projection extends in the circumferential direction on opposite sides of the tape exit position and protrudes from the tape running race to an extent less than the outer circumferential surface of the stationary cylinder.

5. A method for machining a rotary magnetic head cylinder device for enabling suppression of vibrations of a magnetic tape wound thereon, comprising the steps of cut-machining an outer circumferential surface of a stationary cylinder to be disposed relative to a rotary cylinder having at least one video head for contacting the magnetic tape so as to form a tape running race along which the magnetic tape is advanced from an entrance position to an exit position, locating the tape running race radially inside of the outer circumferential surface of the stationary cylinder and concentric therewith, contouring a lower edge of the tape running race as a tape guide shoulder so that the tape guide shoulder extends perpendicularly to the tape running race from the tape running race to the outer circumferential surface of the stationary cylinder, forming a small projection protruding from the tape running race of the stationary cylinder so as to extend in the circumferential direction of the stationary cylinder only in the region of the tape exit position at an upper edge of the stationary cylinder so that the projection has an arcuate surface integral with the tape running race and the tape guide shoulder and having a configuration corresponding to the tape guide shoulder.

6. A method according to claim 5, wherein the step of forming the projection includes forming the projection so as to extend in the circumferential direction on opposite sides of the tape exit position so that the projection protrudes from the tape running race to an extent less than the outer circumferential surface of the stationary cylinder.

* * * * *